United States Patent
Choi

(10) Patent No.: US 11,111,914 B2
(45) Date of Patent: Sep. 7, 2021

(54) PISTON PUMP FOR BRAKE

(71) Applicant: HYUNDAI MOBIS CO., LTD., Seoul (KR)

(72) Inventor: Young Chang Choi, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 117 days.

(21) Appl. No.: 16/598,255

(22) Filed: Oct. 10, 2019

(65) Prior Publication Data

US 2020/0116147 A1 Apr. 16, 2020

(30) Foreign Application Priority Data

Oct. 11, 2018 (KR) .................. 10-2018-0120997

(51) Int. Cl.
*F04B 9/04* (2006.01)
*F04B 53/10* (2006.01)
*B60T 13/16* (2006.01)

(52) U.S. Cl.
CPC .......... *F04B 53/1002* (2013.01); *B60T 13/16* (2013.01); *F04B 9/042* (2013.01)

(58) Field of Classification Search
CPC ...... F04B 53/1002; F04B 9/042; F04B 53/14; F04B 53/12; F04B 53/126; F04B 7/0266; F04B 9/045; B60T 13/16; B60T 17/02; B60T 8/4027; B60T 8/4031
See application file for complete search history.

(56) References Cited

U.S. PATENT DOCUMENTS

| 4,446,886 | A | * | 5/1984 | Taylor | F16K 15/044 137/469 |
| 6,093,003 | A | * | 7/2000 | Hauser | B60T 8/4031 417/523 |
| 6,457,956 | B1 | * | 10/2002 | Hauser | B60T 8/4031 417/470 |
| 8,011,289 | B2 | * | 9/2011 | Waller | B60T 8/4872 92/242 |
| 8,591,209 | B2 | * | 11/2013 | Schmautz | F04B 1/0452 417/549 |
| 8,801,408 | B2 | * | 8/2014 | Druckenmueller | F04B 53/126 417/470 |

(Continued)

FOREIGN PATENT DOCUMENTS

KR 10-2018-0075940 A 7/2018

*Primary Examiner* — Devon C Kramer
*Assistant Examiner* — Thomas Fink
(74) *Attorney, Agent, or Firm* — Morgan, Lewis & Bockius LLP

(57) ABSTRACT

A piston pump for a brake may include: a piston moved by rotation of a motor cam, and movably installed in a piston housing; a sleeve installed in a shape to cover an end of the piston, and having an inner space for storing brake oil moved from the piston; an airtight mounting part coupled to the end of the piston, and blocking brake oil from moving between the piston and the sleeve; a return spring having both sides contacted with the sleeve and the airtight mounting part, and elastically pressing the airtight mounting part toward the motor cam; an inlet ball pressed toward the piston by an inlet spring, and installed in contact with the airtight mounting part; and a check valve installed at a position facing the sleeve, and discharging brake oil to the outside of the sleeve when the pressure of the brake oil rises.

9 Claims, 9 Drawing Sheets

(56) References Cited

U.S. PATENT DOCUMENTS

| | | | | |
|---|---|---|---|---|
| 9,360,008 B2* | 6/2016 | Schumann | ............ | F04B 53/1007 |
| 2008/0188352 A1* | 8/2008 | Gresley | .................. | F16H 57/04 |
| | | | | 477/158 |
| 2010/0215530 A1* | 8/2010 | Schmautz | ............. | F04B 1/0408 |
| | | | | 417/554 |
| 2010/0284841 A1* | 11/2010 | Jahn | ...................... | F04B 53/146 |
| | | | | 417/549 |
| 2011/0099995 A1* | 5/2011 | Schuller | ................ | F04B 1/0404 |
| | | | | 60/591 |
| 2012/0227837 A1* | 9/2012 | Lee | ....................... | F16K 15/044 |
| | | | | 137/511 |
| 2013/0202465 A1* | 8/2013 | Jahn | ..................... | F04B 1/0408 |
| | | | | 417/437 |
| 2016/0160847 A1* | 6/2016 | Choi | .................... | F04B 1/0452 |
| | | | | 417/487 |
| 2020/0180584 A1* | 6/2020 | Gaertner | ............... | F04B 1/0408 |
| 2021/0131425 A1* | 5/2021 | Kim | ......................... | F04B 1/12 |

* cited by examiner

PISTON PUMP FOR BRAKE

CROSS-REFERENCES TO RELATED APPLICATIONS

The present application claims priority to Korean application number 10-2018-0120997, filed on Oct. 11, 2018, which is incorporated by reference in its entirety.

BACKGROUND OF THE INVENTION

The present invention relates to a piston pump for a brake, and more particularly, to a piston pump for a brake, which can reduce the number of parts, and thus reduce the number of operation processes and the manufacturing cost.

In general, a piston pump for a vehicle brake discharges brake oil at a wheel toward a master cylinder when wheel pressure needs to be lowered. On the other hand, the piston pump discharges brake oil at the master cylinder toward the wheel, when wheel pressure needs to be raised.

The operation of the piston pump for a brake is performed as follows. As the brake oil is introduced toward an inlet, an inlet ball is opened. When the brake oil is introduced into a sleeve, the inlet ball is closed. When a motor cam is rotated by an operation of a motor, the piston is moved toward a cap by the motor cam, and thus an outlet ball is opened. The brake oil is discharged toward an outlet through an orifice.

In the piston pump according to the related art, however, two high-pressure seals need to be assembled to the outside of the piston. In order to prevent oil leakage from a contact portion between the piston and the inlet ball made of a metal, the inlet ball is pressed toward the piston to perform leave a mark of the inlet ball on the piston, with the inlet ball placed on the piston. Thus, the number of processes is increased. Furthermore, since the piston has a complex shape and two high-pressure seals and a spring cage need to be separately provided, the number of parts is increased to raise the manufacturing cost. Therefore, there is a need for a structure capable of solving the problem.

The related art of the present invention is disclosed in Korean Patent Publication No. 2018-0075940 published on Jul. 5, 2018 and entitled "Piston Pump for Brake System of Vehicles".

SUMMARY OF THE INVENTION

Embodiments of the present invention are directed to a piston pump for a brake, which can reduce the number of parts, and thus reduce the number of operation processes and the manufacturing cost.

In one embodiment, a piston pump for a brake may include: a piston moved by rotation of a motor cam, and installed in a piston housing so as to linearly move; a sleeve installed in a shape to cover an end of the piston, and having an inner space for storing brake oil moved from the piston; an airtight mounting part coupled to the end of the piston, and blocking brake oil from moving between the piston and the sleeve; a return spring having both sides contacted with the sleeve and the airtight mounting part, and elastically pressing the airtight mounting part toward the motor cam; an inlet ball pressed toward the piston by an inlet spring installed in the airtight mounting part, and installed in contact with the airtight mounting part; and a check valve installed at a position facing the sleeve, and configured to discharge brake oil in the sleeve to the outside of the sleeve when the pressure of the brake oil rises.

The piston may include: a piston body having an inner passage through which brake oil is moved; and an insertion protrusion extended from the piston body toward the airtight mounting part, and inserted into the airtight mounting part.

The airtight mounting part may include: a mounting body supporting the inlet spring; an inner member extended from the mounting body so as to be positioned in the insertion protrusion, and contacted with the inlet ball; and an outer member extended from the mounting body so as to be positioned between the sleeve and the insertion protrusion, and blocking movement of brake oil.

The airtight mounting part may be made of a flexible material.

The inner member may be connected to an end of the mounting body while forming a ring-shaped belt.

The insertion protrusion may have an inclined surface formed on the inside thereof, facing the inner member, and the inner member may be pushed by the inclined surface so as to be pressed against the inlet ball.

The check valve may include: a cap member installed in a shape to cover an end of the sleeve; an outlet spring having one side inserted into the cap member; and an outlet ball installed at a position facing a discharge hole formed in the sleeve, and elastically supported by the outlet spring.

The piston pump may further include an orifice flow path positioned between the cap member and the sleeve, and guiding brake oil discharged to the outside of the sleeve through the discharge hole.

In another embodiment, a piston pump for a brake may include: a piston moved by rotation of a motor cam, and installed in a piston housing so as to linearly move; a sleeve installed in a shape to cover an end of the piston, and having an inner space for storing brake oil moved from the piston; an airtight mounting part coupled to the end of the piston, and blocking brake oil from moving between the piston and the sleeve; a return spring having both sides contacted with the sleeve and the airtight mounting part, and elastically pressing the airtight mounting part toward the motor cam; and an inlet ball pressed toward the piston by an inlet spring installed in the airtight mounting part, and installed in contact with the airtight mounting part.

The piston may include: a piston body having an inner passage through which brake oil is moved; and an insertion protrusion extended from the piston body toward the airtight mounting part, and inserted into the airtight mounting part.

The airtight mounting part may include: a mounting body supporting the inlet spring; an inner member extended from the mounting body so as to be positioned in the insertion protrusion, and contacted with the inlet ball; and an outer member extended from the mounting body so as to be positioned between the sleeve and the insertion protrusion, and blocking movement of brake oil.

In accordance with the embodiment of the present invention, the airtight mounting part may be inserted between the sleeve and the piston and not only serve as a high-pressure seal, but also serve to support the inlet spring. Therefore, the number of parts can be reduced in comparison to the related art, which makes it possible to shorten the operation process and to improve the productivity.

Furthermore, since the airtight mounting part is extended between the inlet ball and the piston and stably supports the inlet ball, the airtight mounting part may prevent leakage at the contact with the inlet ball, thereby improving the operation reliability.

DESCRIPTION OF SPECIFIC EMBODIMENTS

Hereafter, a piston pump for a brake in accordance with an embodiment of the present invention will be described in detail with reference to the accompanying drawings. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
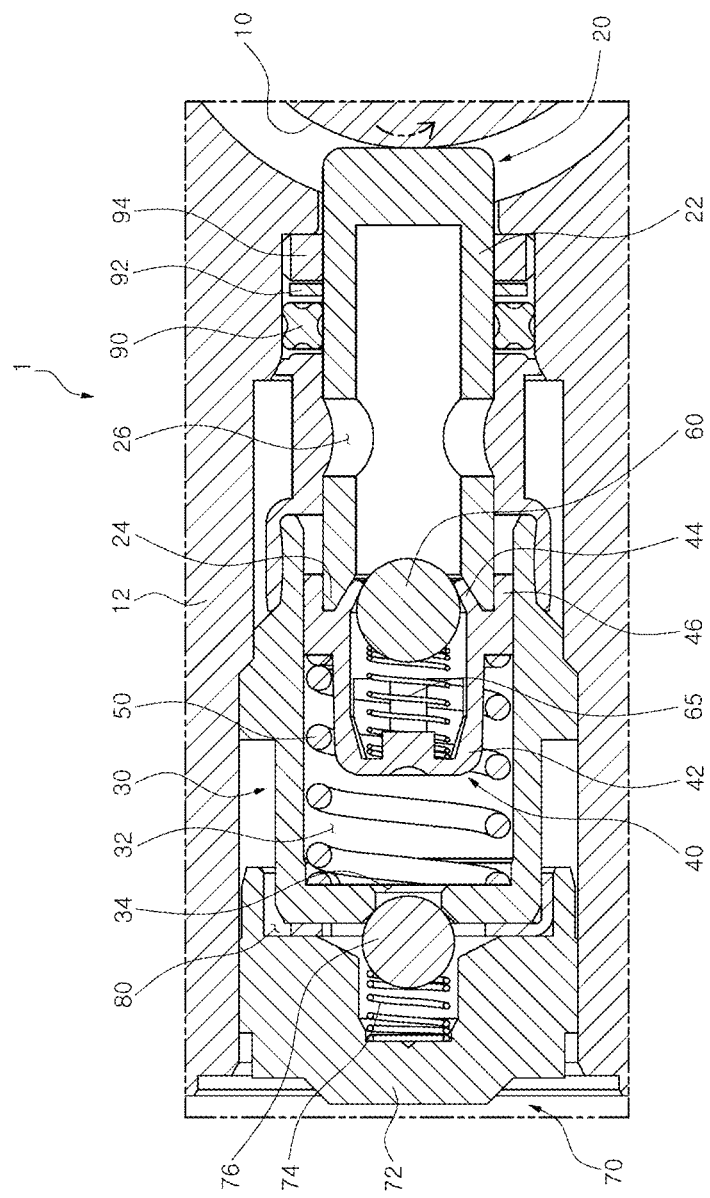
FIG. 1 is a cross-sectional view schematically illustrating a structure of a piston pump for a brake in accordance with an embodiment of the present invention.
Figure 2:
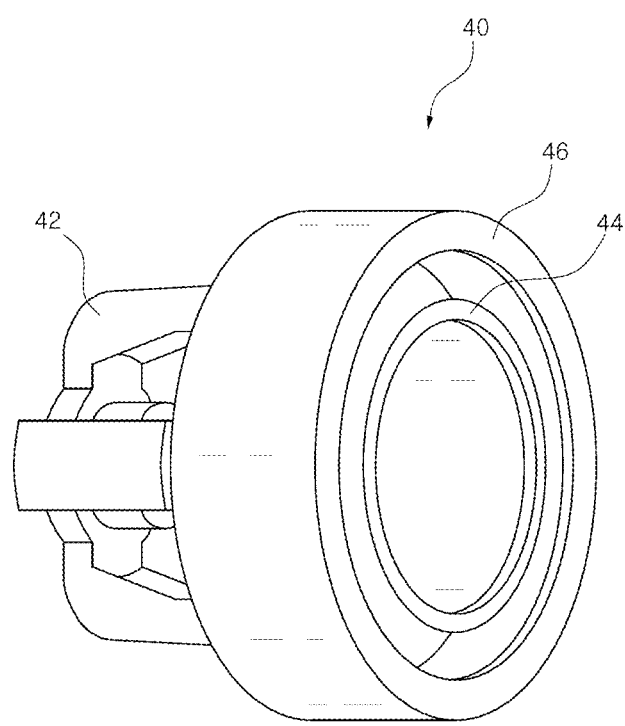
FIG. 2 is a perspective view illustrating an airtight mounting part in accordance with an embodiment of the present invention.
Figure 3:
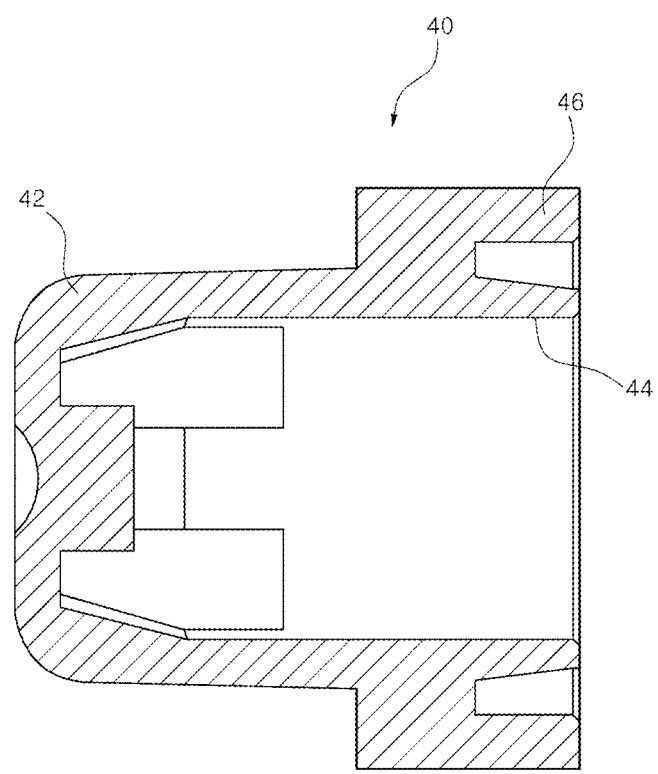
FIG. 3 is a cross-sectional view of the airtight mounting part in accordance with the embodiment of the present invention.
Figure 4:
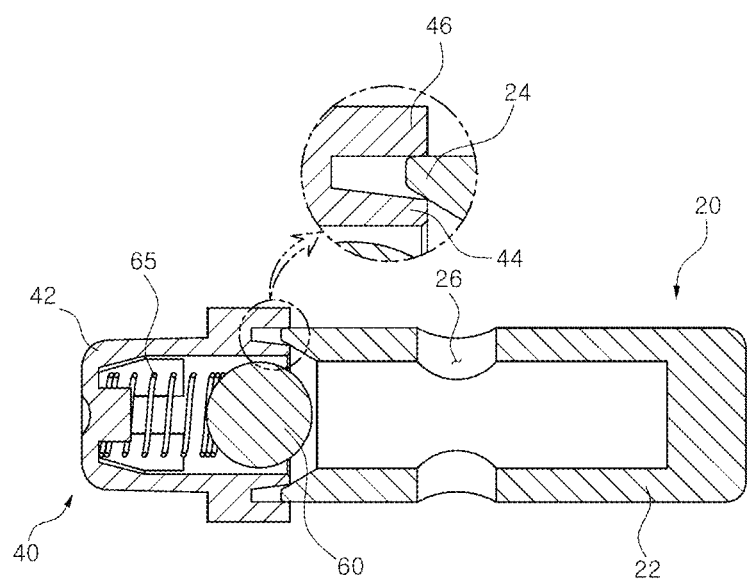
FIG. 4 is a cross-sectional view illustrating a state before the airtight mounting part in accordance with the embodiment of the present invention is coupled to a piston.
Figure 5:
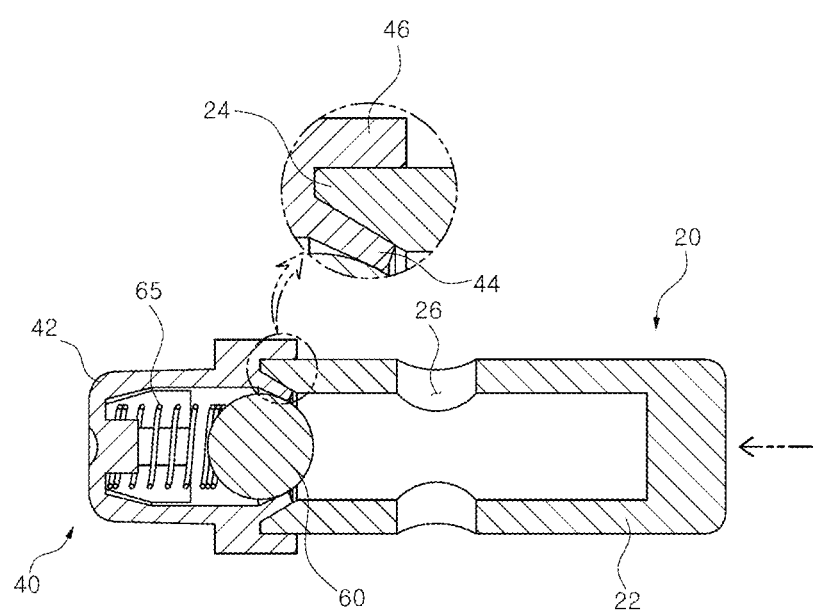
FIG. 5 is a cross-sectional view illustrating a state in which the airtight mounting part in accordance with the embodiment of the present invention is coupled to the piston.
Figure 6:
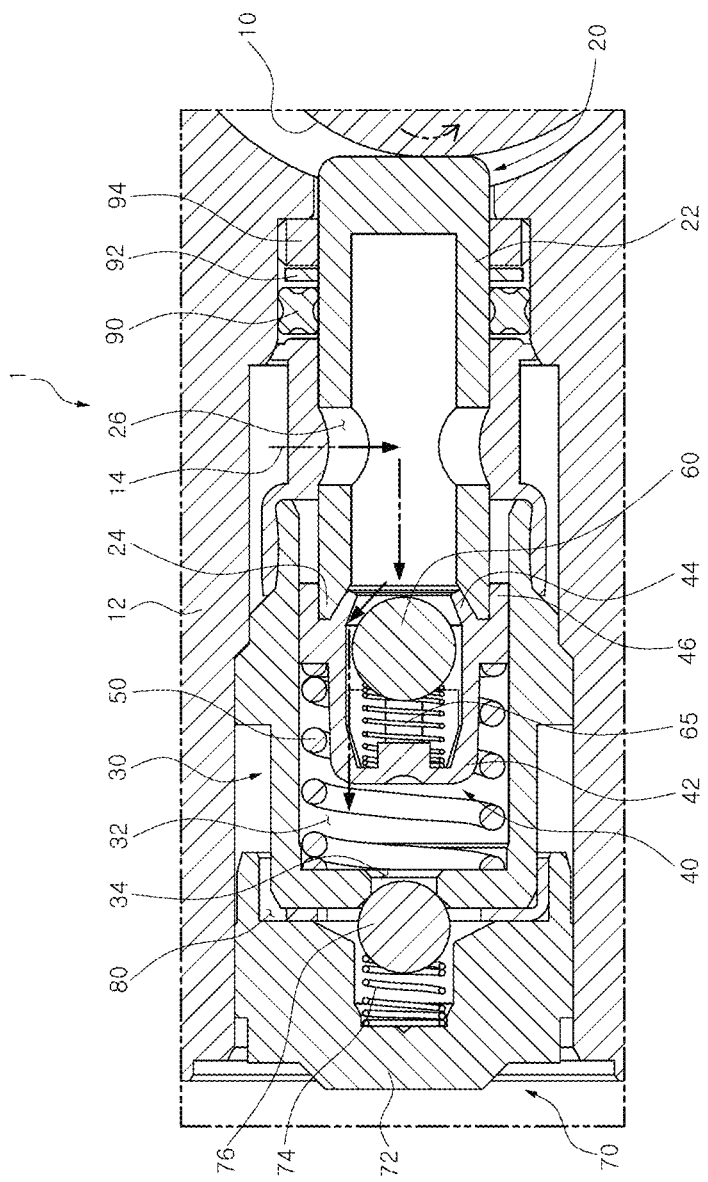
FIG. 6 is a cross-sectional view illustrating a state in which brake oil is supplied into a sleeve in accordance with the embodiment of the present invention.
Figure 7:
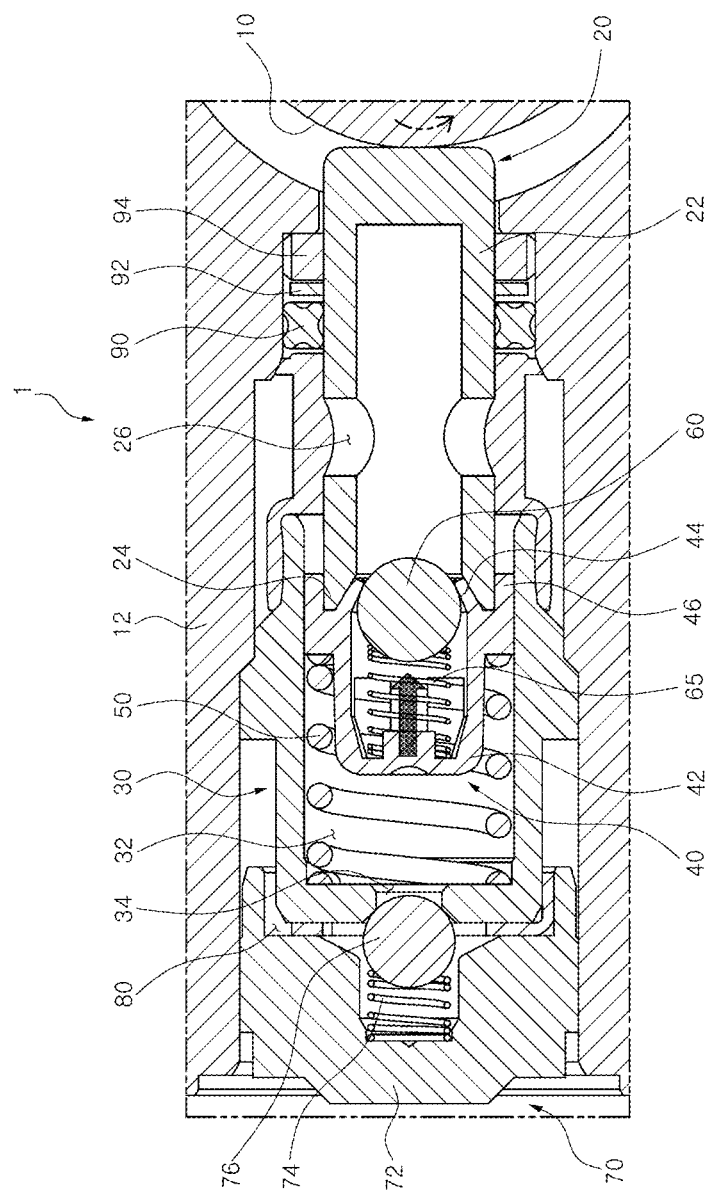
FIG. 7 is a cross-sectional view illustrating a state in which an inlet ball in accordance with the embodiment of the present invention is pressed against an inner member so as to block movement of the brake oil.
Figure 8:
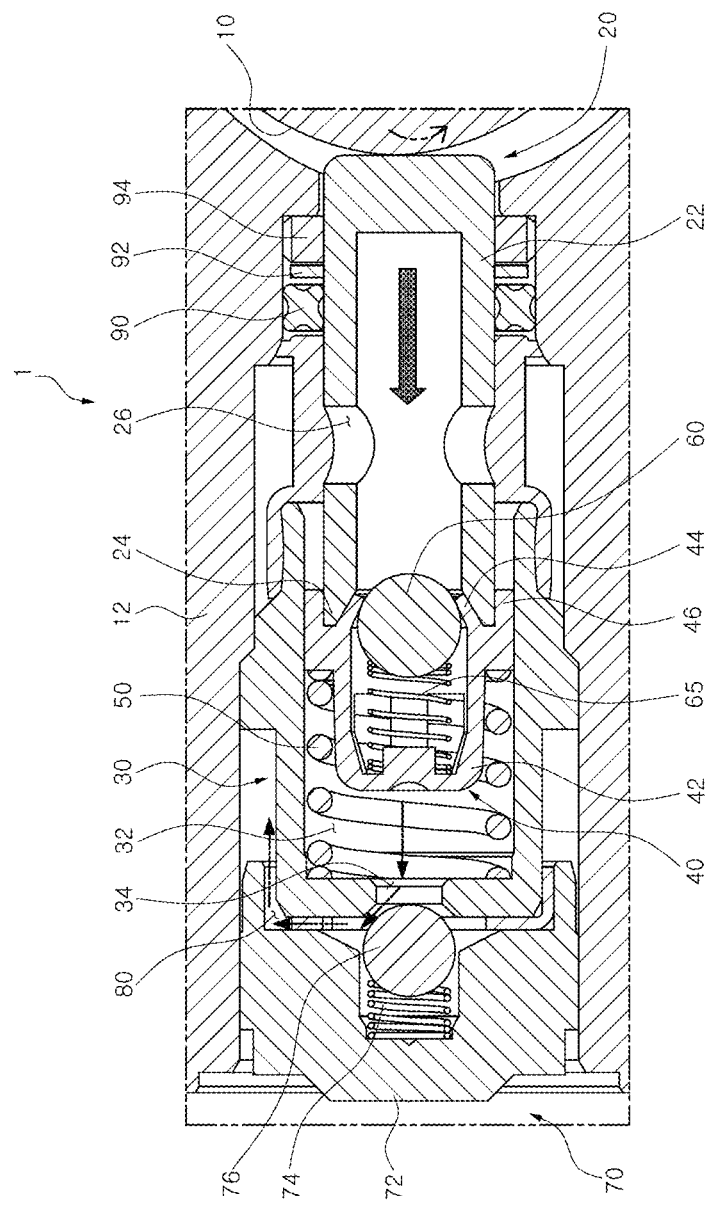
FIG. 8 is a cross-sectional view illustrating a state in which the piston in accordance with the embodiment of the present invention is moved to discharge the brake oil in the sleeve to the outside of the sleeve.
Figure 9:
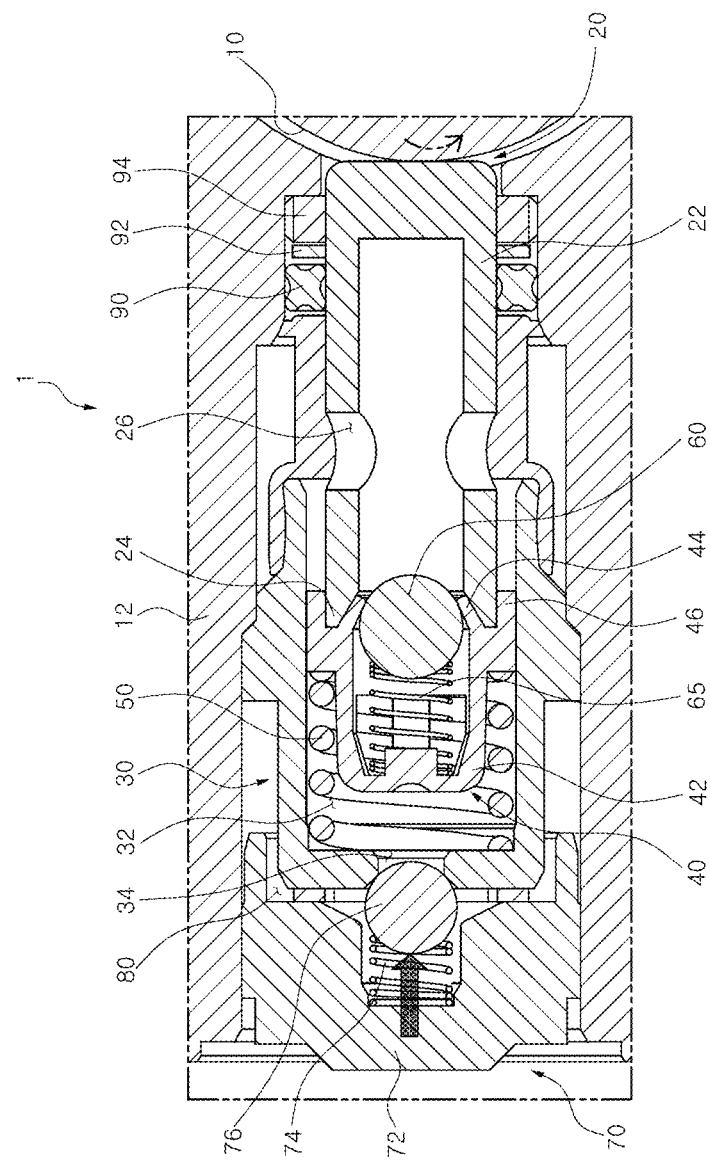
FIG. 9 is a cross-sectional view illustrating a state in which an outlet ball in accordance with the embodiment of the present invention is pressed against a discharge hole to block movement of the brake oil.

FIG. 1 is a cross-sectional view schematically illustrating a structure of a piston pump for a brake in accordance with an embodiment of the present invention, FIG. 2 is a perspective view illustrating an airtight mounting part in accordance with an embodiment of the present invention, FIG. 3 is a cross-sectional view of the airtight mounting part in accordance with the embodiment of the present invention, FIG. 4 is a cross-sectional view illustrating a state before the airtight mounting part in accordance with the embodiment of the present invention is coupled to a piston, FIG. 5 is a cross-sectional view illustrating a state in which the airtight mounting part in accordance with the embodiment of the present invention is coupled to the piston, FIG. 6 is a cross-sectional view illustrating a state in which brake oil is supplied into a sleeve in accordance with the embodiment of the present invention, FIG. 7 is a cross-sectional view illustrating a state in which an inlet ball in accordance with the embodiment of the present invention is pressed against an inner member so as to block movement of the brake oil, FIG. 8 is a cross-sectional view illustrating a state in which the piston in accordance with the embodiment of the present invention is moved to discharge the brake oil in the sleeve to the outside of the sleeve, and FIG. 9 is a cross-sectional view illustrating a state in which an outlet ball in accordance with the embodiment of the present invention is pressed against a discharge hole to block movement of the brake oil.

As illustrated in FIGS. 1 to 3, a piston pump 1 for a brake in accordance with an embodiment of the present invention may include a piston 20, a sleeve 30, an airtight mounting part 40, a return spring 50, an inlet ball 60 and a check valve 70. The piston 20 may be moved by rotation of a motor cam 10 and installed in a piston housing 12 so as to linearly move. The sleeve 30 may be installed in a shape to cover an end of the piston 20, and have an inner space 32 for storing brake oil 14 moved from the piston 20. The airtight mounting part 40 may be coupled to the end of the piston 20 and block the brake oil 14 from moving between the piston 20 and the sleeve 30. The return spring 50 may elastically press the airtight mounting part 40 toward the motor cam 10 while both sides thereof are contacted with the sleeve 30 and the airtight mounting part 40. The inlet ball 60 may be pressed toward the piston 20 by an inlet spring 65 installed in the airtight mounting part 40, and installed in contact with the airtight mounting part 40. The check valve 70 may be installed at a position facing the sleeve 30, and discharge the brake oil 14 to the outside of the sleeve 30 when the pressure of the brake oil 14 in the sleeve 30 rises.

The motor cam 10 may be assembled to an output shaft of a motor, and rotated to perform a cam motion when the motor is operated. Thus, the motor cam 10 may reciprocate the piston 20 in a linear direction. The piston housing 12 may be fixed to a vehicle body, and have an inner space in which the parts of the piston pump 1 for a brake are assembled.

The piston 20 may be modified in various shapes as long as the piston 20 can be moved by the rotation of the motor cam 10 and installed in the piston housing 12 so as to linearly move.

When the piston 20 is coupled to the airtight mounting part 40 serving as a high-pressure seal, the piston 20 may induce an inner member 44 of the airtight mounting part 40 to be deformed inward. Thus, the inner member 44 may function as a check valve seat contacted with the inlet ball 60.

The piston 20 may be assembled to the airtight mounting part 40, and guide the brake oil 14 toward the sleeve 30 while reciprocating in a linear direction. The piston 20 may have a flow path through which the brake oil 14 moved into the piston 20 through an insertion hole 26 is moved toward the airtight mounting part 40. A filter may be installed in a path through which the brake oil 14 is moved toward the piston 20, in order to prevent introduction of foreign matters.

The piston 20 in accordance with the embodiment of the present invention may include a piston body 22, an insertion protrusion 24 and the insertion hole 26.

The piston body 22 has an inner passage formed in a horizontal direction, such that the brake oil 14 is moved through the passage. Since the insertion hole 26 is formed at a side surface of the piston body 22, the brake oil 14 may be moved into the piston body 22 through the insertion hole 26.

The insertion protrusion 24 may be extended from the piston body 22 toward the airtight mounting part 40, and inserted into the airtight mounting part 40. The insertion protrusion 24 in accordance with the embodiment of the present invention may be connected to the end of the piston body 22, and have an inclined surface formed on the inside thereof so as to induce the deformation of the inner member 44.

The deformation of the inner member 44 will be described in more detail as follows. The inclined surface may be formed on the inside of the insertion protrusion 24, facing the inner member 44, and the inner member 44 may be pushed by the inclined surface of the insertion protrusion 24 and pressed against the inlet ball 60. Thus, airtightness between the inlet ball 60 and the inner member 44 can be improved.

The sleeve 30 may be installed in a shape to cover the end of the piston 20, and have an inner space 32 for storing the brake oil 14 moved from the piston 20. One side of the sleeve 30 in accordance with the embodiment of the present invention may be open in the direction that the end of the piston 20 is inserted, and a discharge hole 34 for discharging the brake oil 14 may be formed on the other side of the sleeve 30.

The sleeve 30 and a cap member 72 of the check valve 70 may be partially spaced apart at a preset interval so as to form an orifice flow path 80 for discharging the brake oil 14. When the piston 20 is linearly reciprocated by the motor cam 10, a high-pressure pressure chamber may be formed in the sleeve 30.

The airtight mounting part 40 may be deformed in various shapes as long as the airtight mounting part 40 is coupled to the end of the piston 20 and partially inserted between the piston 20 and the sleeve 30 so as to perform a sealing function of blocking the movement of the brake oil 14. The airtight mounting part 40 may function as not only a high-pressure seal for preventing leakage of oil in the sleeve 30, but also an inlet check valve in which the inlet spring 65 and the inlet ball 60 are installed. Furthermore, a space for coupling to the piston 20 may be formed at the circumference of the airtight mounting part 40.

The airtight mounting part 40 in accordance with the embodiment of the present invention may include a mounting body 42, the inner member 44 and an outer member 46. The mounting body 42 may support the inlet spring 65. The inner member 44 may be extended from the mounting body 42 so as to be positioned in the insertion protrusion 24, and contacted with the inlet ball 60. The outer member 46 may be extended from the mounting body 42 so as to be positioned between the sleeve 30 and the insertion protrusion 24, and block movement of the brake oil 14.

The mounting body 42 may form a space through which the brake oil 14 is moved, and the inlet spring 65 may be installed in the mounting body 42. The inner member 44 and the outer member 46 may be connected to the mounting body 42 forming a concave space.

The inner member 44 may be connected to the end of the mounting body 42 while forming a ring-shaped belt, and the outer member 46 may be connected to the end of the mounting body 42 while forming an L-shaped cross-section. The insertion protrusion 24 of the piston 20 may be inserted between the inner member 44 and the outer member 46.

Since the outer member 46 is positioned between the sleeve 30 and the piston 20, the outer member 46 may function as a high-pressure seal. When the inner member 44 is assembled to the piston 20, the inner member 44 may be deformed inward along the inclined surface of the insertion protrusion 24. Since the deformed inner member 44 functions as a seat pressed against the inlet ball 60, the inlet ball 60 may be pressed against the inner member 44 and block the brake oil 14 from moving between the inlet ball 60 and the inner member 44.

The airtight mounting part 40 may be formed of a flexible material such that the inner member 44 can be deformed when the airtight mounting part 40 is coupled to the piston 20. However, the airtight mounting part 40 is not limited thereto, but may be formed of various materials including plastic.

The return spring 50 may elastically press the airtight mounting part 40 toward the motor cam 10 while both sides thereof are contacted with the sleeve 30 and the airtight mounting part 40. The return spring 50 may be positioned in the inner space 32 of the sleeve 30, and have one side contacted with the outer member 46 and the other contacted with the inside of the sleeve 30. When the piston 20 is moved toward the check valve 70 by the motor cam 10 and then moved to the initial position, the return spring 50 may provide an elastic force of pressing the piston 20 in the direction that the motor cam 10 is installed.

The inlet ball 60 may be pressed toward the piston 20 by the inlet spring 65 installed in the airtight mounting part 40, and installed in contact with the airtight mounting part 40. The inlet ball 60 may serve to open/close a flow path of the inlet check valve.

The inlet spring 65 may press the inlet ball 60 in the direction that the motor cam 10 is installed, while one side thereof is contacted with the inlet ball 60 and the other side thereof is contacted with the inner central portion of the mounting body 42. Therefore, the inlet ball 60 may be pressed against the inner member 44 by a preset force, and thus function as a ball of the check valve.

The check valve 70 may be formed in various shapes, as long as the check valve 70 is installed at a position facing the sleeve 30 and discharges the brake oil 14 in the sleeve 30 to the outside of the sleeve 30 when the pressure of the brake oil 14 rises. The check valve 70 in accordance with the embodiment of the present invention may include a cap member 72, an outlet spring 74 and an outlet ball 76.

The outlet spring 74 may be installed in the cap member 72 installed in a shape to cover the end of the sleeve 30, and elastically press the outlet ball 76 toward the discharge hole 34 of the sleeve 30. The cap member 72 may be forced into the sleeve 30 so as to constitute the check valve 70, and the orifice flow path 80 may be formed in the cap member 72.

The outlet spring 74 may be assembled to the outlet ball 76, and serve to push the outlet ball 76 when the check valve performs the role. One side of the outlet spring 74 may be inserted into the cap member 72, and the other side of the outlet spring 74 may be contacted with the outlet ball 76.

The outlet ball 76 may be formed in a spherical shape, and installed at a position facing the discharge hole 34 formed in the sleeve 30. The outlet ball 76 may be elastically supported by the outlet spring 74, and serve to open/close a flow path of the check valve 70.

The orifice flow path 80 in accordance with the embodiment of the present invention may be positioned between the cap member 72 and the sleeve 30, and form a flow path for guiding the brake oil 14 discharged to the outside of the sleeve 30 through the discharge hole 34. The orifice flow path 80 may also serve to reduce pulsation of the brake oil 14 discharged from the sleeve 30.

A low-pressure seal 90 may be assembled between the piston housing 12 and the piston 20, and block a flow of the brake oil 14 moved along the outside of the piston 20. A backup ring 92 may be installed next to the low-pressure seal 90, and serve to support the low-pressure seal 90 when pressure is applied to the low-pressure seal 90. A guide ring 94 may be installed next to the backup ring 92, and serve to guide the piston 20 when the piston is linearly reciprocated in the side-to-side direction.

Hereafter, the operation of the piston pump 1 of a brake in accordance with the embodiment of the present invention will be described in detail with reference to the accompanying drawings.

As illustrated in FIGS. 4 and 5, the inlet spring 65 and the inlet ball 60 may be assembled to the inside of the mounting body 42, and the insertion protrusion 24 of the piston 20 may be inserted into a groove formed between the inner member 44 and the outer member 46. When the insertion protrusion 24 of the piston 20 is inserted between the inner member 44 and the outer member 46, the inner member 44 may be pushed by the inclined surface of the insertion protrusion 24 and deformed toward the inside of the piston 20 so as to form a seat contacted with the inlet ball 60. In general, the seat contacted with the inlet ball 60 may be formed by processing a metal, and an operation of forming a mark by pressing the seat with the inlet ball 60 may be needed to prevent leakage of the brake oil 14. In the present invention, however, the inner member 44 formed of a plastic material may function as a seat. Therefore, a separate operation of forming a ball mark by moving the inlet ball 60 may be omitted.

Referring to FIG. 6, a process in which oil is supplied to the piston 20 will be described as follows. First, the motor may be rotated to rotate the eccentrically positioned motor cam 10. The rotation of the motor cam 10 may move the piston 20 to the rear side where the motor cam 10 is installed. At this time, since the pressure of the brake oil 14 in the inner space 32 of the sleeve 30 is lowered, the brake oil 14 in the piston 20 may be moved to the inner space 32 of the sleeve 30 while pushing the inlet ball 60.

As illustrated in FIG. 7, when the pressure of the brake oil 14 in the inner space 32 of the sleeve 30 becomes equal to the pressure of the brake oil 14 in the piston 20, the inlet spring 65 may be press the inlet ball 60 against the inner member 44 so as to block the movement of the brake oil 14.

Next, a process in which the brake oil 14 is discharged to the outside of the sleeve 30 will be described as follows. As illustrated in FIG. 8, the piston 20 may be moved toward the check valve 70 by the rotation of the motor cam 10. The piston 20 may be advanced to compress the brake oil 14 in the inner space 32 of the sleeve 30. Therefore, the pressure applied to the outlet ball 76 may be raised to compress the outlet spring 74. Since the outlet ball 76 is moved away from the discharge hole 34, a space may be formed between the sleeve 30 and the outlet ball 76. Therefore, the brake oil 14 may be discharged to the outside of the piston pump 1 for a brake through the orifice flow path 80.

As illustrated in FIG. 9, when the external pressure of the piston pump 1 for a brake and the internal pressure of the sleeve 30 become equal to each other, the outlet spring 74 may push the outlet ball 76 to block the discharge hole 34 of the sleeve 30.

In accordance with the embodiment of the present invention, the airtight mounting part 40 may be inserted between the sleeve 30 and the piston 20 and not only serve as a high-pressure seal, but also serve to support the inlet spring 65. Therefore, the number of parts can be reduced in comparison to the related art, which makes it possible to shorten the operation process and to improve the productivity. Furthermore, since the airtight mounting part 40 is extended between the inlet ball 60 and the piston 20 and stably supports the inlet ball 60, the airtight mounting part 40 may prevent leakage at the contact with the inlet ball 60, thereby improving the operation reliability.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A piston pump for a brake, comprising:
a piston moved by rotation of a motor cam, and installed in a piston housing so as to linearly move;
a sleeve installed in a shape to cover an end of the piston, and having an inner space for storing brake oil moved from the piston;
an airtight mounting part coupled to the end of the piston, and blocking the brake oil from moving between the piston and the sleeve;
a return spring having two axial ends contacted with the sleeve and the airtight mounting part, and elastically pressing the airtight mounting part toward the motor cam;
an inlet ball pressed toward the piston by an inlet spring installed in the airtight mounting part, and installed in contact with the airtight mounting part; and
a check valve installed at a position facing the sleeve, and configured to discharge the brake oil in the sleeve to the outside of the sleeve when the pressure of the brake oil rises,
wherein the piston comprises:
a piston body having an inner passage through which the brake oil is moved; and
an insertion protrusion extended from the piston body toward the airtight mounting part, and inserted into the airtight mounting part, and
wherein the airtight mounting part has a groove into which the insertion protrusion of the piston is inserted, wherein due to the insertion of the insertion protrusion, a width of the groove before the insertion protrusion is inserted into the groove is smaller than the width after the insertion protrusion is inserted into the groove.

2. The piston pump of claim 1, wherein the airtight mounting part comprises:
a mounting body supporting the inlet spring;
an inner member extended from the mounting body so as to be positioned in the insertion protrusion, and contacted with the inlet ball; and
an outer member extended from the mounting body so as to be positioned between the sleeve and the insertion protrusion, and blocking movement of the brake oil.

3. The piston pump of claim 2, wherein the airtight mounting part is made of a flexible material.

4. The piston pump of claim 2, wherein the inner member is connected to an end of the mounting body while forming a ring-shaped belt.

5. The piston pump of claim 2, wherein the insertion protrusion has an inclined surface formed on the inside thereof, facing the inner member, and the inner member is pushed by the inclined surface so as to be pressed against the inlet ball.

6. The piston pump of claim 1, wherein the check valve comprises:
a cap member installed in a shape to cover an end of the sleeve;
an outlet spring having one side inserted into the cap member; and
an outlet ball installed at a position facing a discharge hole formed in the sleeve, and elastically supported by the outlet spring.

7. The piston pump of claim 6, further comprising an orifice flow path positioned between the cap member and the sleeve, and guiding the brake oil discharged to the outside of the sleeve through the discharge hole.

8. A piston pump for a brake, comprising:
a piston moved by rotation of a motor cam, and installed in a piston housing so as to linearly move;

a sleeve installed in a shape to cover an end of the piston, and having an inner space for storing brake oil moved from the piston;

an airtight mounting part coupled to the end of the piston, and blocking the brake oil from moving between the piston and the sleeve;

a return spring having two axial ends contacted with the sleeve and the airtight mounting part, and elastically pressing the airtight mounting part toward the motor cam; and an inlet ball pressed toward the piston by an inlet spring installed in the airtight mounting part, and installed in contact with the airtight mounting part, wherein the piston comprises:

a piston body having an inner passage through which the brake oil is moved; and an insertion protrusion extended from the piston body toward the airtight mounting part, and inserted into the airtight mounting part, and wherein the airtight mounting part has a groove into which the insertion protrusion of the piston is inserted, wherein due to the insertion of the insertion protrusion, a width of the groove before the insertion protrusion is inserted into the groove is smaller than the width after the insertion protrusion is inserted into the groove.

9. The piston pump of claim 8, wherein the airtight mounting part comprises:

a mounting body supporting the inlet spring;

an inner member extended from the mounting body so as to be positioned in the insertion protrusion, and contacted with the inlet ball; and an outer member extended from the mounting body so as to be positioned between the sleeve and the insertion protrusion, and blocking movement of the brake oil.

\* \* \* \* \*